United States Patent [19]
Tate

[11] 3,988,253
[45] Oct. 26, 1976

[54] COMPOSITION AND METHOD FOR TREATING SCALE

[75] Inventor: Jack F. Tate, Houston, Tex.

[73] Assignee: Texaco Inc., New York, N.Y.

[22] Filed: Dec. 20, 1974

[21] Appl. No.: 534,955

[52] U.S. Cl. .................................. 252/82; 252/80; 252/525; 252/545; 252/175
[51] Int. Cl.$^2$ .......................................... C02B 5/06
[58] Field of Search............. 21/8.7 R; 252/82, 180, 252/525, 545, 175, 80

[56] References Cited
UNITED STATES PATENTS

| | | | |
|---|---|---|---|
| 2,964,467 | 12/1960 | Lambert et al. | 252/527 |
| 3,233,983 | 2/1966 | Bauer et al. | 23/300 |
| 3,353,927 | 11/1967 | Ralston | 23/304 |

*Primary Examiner*—Mayer Weinblatt
*Attorney, Agent, or Firm*—T. H. Whaley; C. G. Ries; James F. Young

[57] ABSTRACT

Composition and method for the treatment of inorganic mineral scale, using a treating composition consisting of a water soluble substituted taurine of prescribed formula in an amount of from 0.0005% to about 0.005%, on a weight basis.

1 Claim, No Drawings

COMPOSITION AND METHOD FOR TREATING SCALE

This invention relates to a composition useful in treating oil and gas wells and to a method of using such composition for such treatment. More particularly this invention is directed to a composition and method useful in the prevention and/or inhibition of the build-up of undesirable inorganic mineral scale deposits in oil and gas wells, their flow lines, auxiliary producing equipment, such as heat exchangers and cooling towers, as well as the producing strata in the vicinity of the well bore. Additionally, the invention is useful in the prevention and/or inhibition of build-up of scale deposits in aqueous systems susceptible to mineral scale formation.

The formation of objectionable scale deposits, such as calcium and barium sulfate and calcium carbonate, or more broadly, the sparingly water soluble alkaline earth metal sulfates and carbonates, hereinafter referred to as "inorganic mineral scale", is rather widespread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams at the well bore may result in the deposition of crystalline calcium sulfate which gradually builds up on the walls of the well tubing, for example, to a point where it may choke off fluid flow in the tube if remedial measures were not undertaken.

Another cause of the inorganic mineral scale formation is attributed to the precipitation of scale material from potentially supersaturated solutions thereof. When the operating variables of temperature and pressure change adversely, or solvent is allowed to evaporate, thus concentrating the solutions, precipitation of the salt on the tubing and surrounding strata occurs.

The use of strong alkali solutions for the removal of calcium sulfate species of inorganic mineral scale has been proposed. It has been claimed that under certain favorable conditions of temperature and time, concentrated alkali solutions will, in some cases, provide a break-up of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This precipitate may then be removed by suitable mechanical means. Such a method is obviously undesirable in that considerable periods of time are involved and the use of mechanical apparatus is expensive, and in some cases, either undesirable or mechanically impossible. Moreover, strong aqueous alkali is not effective in preventing or inhibiting the build-up of scale deposits in well tubing, production equipment and the producing strata about the bore hole.

It is, accordingly, an object of this invention to provide a method of inhibiting and/or preventing the build-up of inorganic mineral scale deposits in gas and oil flow lines, auxiliary equipment, well tubing and the surrounding subsurface strata.

A further object is to provide an inorganic mineral scale treating composition for use in preventing the build-up of scale deposits in the well tubing, producing equipment, the bore hole and surrounding strata.

A still further object of this invention is to provide a method of and composition for the treatment of gas and oil well tubing and the like containing inorganic mineral scale therein to prevent and/or inhibit the build-up of further scale deposits in the tubing.

These as well as other objects are accomplished according to the present invention which comprises an inorganic mineral scale prevention and/or inhibition composition comprising a water soluble substituted taurine having the following general formula:

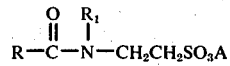

wherein R and $R_1$ are aliphatic hydrocarbon groups, both either saturated or unsaturated (except for the methyl group), each of said groups R and $R_1$ containing from 1 to 20 carbon atoms therein, the sum total of the carbon atoms in both R and $R_1$ being between 9 and 30, and A is an alkali metal or ammonium ion, said substituted taurine being used in an amount of from about 0.0005% to about 0.005%, on a weight basis.

Representative substituted taurines include those wherein either the R group or the $R_1$ group is methyl, ethyl, propyl, butyl, pentyl, hexyl, heptyl, octyl, nonyl, decyl, undecyl, tridecyl, tetradecyl, pentadecyl, hexadecyl, heptadecyl, octadecyl, nonadecyl, and eicosyl, including the branched chain and unsaturated variants thereof, such as oleyl. It is to be understood that mixtures of these above named R and $R_1$ groups can be used, such as those obtained from coconut, tall oil, tallow and palm oils.

The invention also comprises a method of treating equipment susceptible to the development of scale deposits therein such as heat exchangers and the like, particularly oil field equipment, using the scale prevention composition.

The preferred class of substituted taurines are those wherein the $R_1$ substituent is a relatively low molecular weight aliphatic hydrocarbon group such as methyl, ethyl, propyl, isopropyl, butyl or isobutyl and the other substituent R, is a saturated or unsaturated including branched chain, aliphatic hydrocarbon containing between 8 and 20 carbon atoms, including more specifically such hydrocarbons derived from the coconut, palm and tall oil acids etc., high in oleyl groups.

In carrying out one aspect of the present invention the method thereof comprises introducing the scale prevention composition into the equipment to be protected, such as oil well tubing, in the form of an aqueous solution in an amount sufficient to provide the aforesaid substituted taurine therein continuously in an amount of from 0.0005% to about 0.005%, preferably 0.0005% to 0.003%, based on the weight of said substituted taurine, and maintaining the scale treating composition in contact with the internal surfaces thereof to prevent and/or inhibit the development of scale deposits or additional scale deposits therein. It is desirable to circulate the scale prevention composition through the system continuously to provide adequate contact of the composition with the surfaces to be protected. Underground strata surrounding the well bore can be treated in a like manner, i.e. by passing the solution into said strata such as by injection of the solution down through the bore hole or production tubing, preferably under pressure.

Use of the substituted taurine in amounts of about 0.0005% provide satisfactory scale inhibition whereas amounts above about 0.005% are unnecessary.

In addition, it has been found that excellent protection against continued deposition of objectionable inorganic mineral scale deposits can be obtained by maintaining the treating composition in contact with the preexisting scale continuously at a concentration of 0.0005% to about 0.005%.

A more complete understanding of the invention will be obtained from the following illustrative examples.

The following procedure was used in the evaluations.

A 600 milliliter glass beaker was provided with sufficient calcium sulfate and sodium chloride, obtained by mixing solutions of calcium chloride and sodium sulfate and adding additional solid sodium chloride thereto to produce an aqueous concentration thereof of 10,000 ppm of calcium sulfate and 50,000 ppm of sodium chloride. A hollow metal rotor attached to an externally provided mechanical stirring device was immersed in the test solution for a 24 hour time period. The solution was gradually heated by means of an electric heater inside the hollow rotor and was maintained at a temperature of 118° F. during the test period. At the end of the 24 hours, the rotor was removed from the solution and from the stirrer, the scale deposited thereon removed, dried and weighed. The above laboratory test procedure affords good correlation between the results thereby obtained and actual field performance of scale preventing compositions.

The following table records the results of the tests. The values are reported as grams of scale.

Inspection of the data in the above Table show that the substituted taurines of the present invention are effective inorganic mineral scale inhibitors.

It has been found that the inorganic mineral scale prevention compositions of the present invention are especially effective in the presence of high calcium ion concentrations about 0.5% by weight or more, and particularly and somewhat uniquely in applications where high aqueous solution temperatures are encountered such as above 100° C. The compositions of the present invention are temperature stable and effective as scale inhibitors at temperatures up to about 150° C. e.g. 100°–150° C.

The composition of Example A above can be prepared in the following manner:

The sodium salt of taurine, $NH_2CH_2CH_2SO_3Na$, is reacted with methyl amine to prepare the intermediate sodium N-methyltaurate. This intermediate is reacted with the acid chloride of oleic acid to complete the preparation of sodium N,N-methyloleyltaurate. The conditions under which this known reaction is conducted is well known in the art, including obvious variations thereof.

Obviously, other modifications and variations of the invention as hereinbefore set forth may be made without departing from the spirit and scope thereof and therefore only such limitations should be imposed as are indicated in the appended claims.

I claim:

1. Method of controlling the build-up of inorganic mineral scale selected from the group consisting of calcium sulfate, barium sulfate and calcium carbonate in an aqueous system which comprises incorporating into said system a scale-treating composition consisting of an acqueous solution of from about 0.0005% to about 0.003% on a weight basis, of a water-soluble substituted taurine selected from the group consisting of sodium N,N-methyloleyltaurate, sodium N,N-methylpalmitoyltaurate and sodium N,N-methyl tall oil acids taurate.

* * * * *

TABLE

| | AMOUNT OF ADDITIVE (ppm) (% × 10⁴) | | | | | | |
|---|---|---|---|---|---|---|---|
| | 0 | 1.7 | 3.3 | 5 | 6.7 | 8.3 | 10 | 15 |
| 1-Additive A[1] | 1.8 | 0.25 | 0.6 | 0.0 | 0.0 | 0.0 | — | — |
| 2-Additive B[2] | 1.7 | — | — | 0.1 | — | — | 0.0 | 0.0 |
| 3-Additive C[3] | 1.5 | — | — | 0.1 | — | — | 0.0 | 0.0 |

[1] A - Sodium N, N-methyloleoyltaurate
[2] B - Sodium N, N-methylpalmitoyltaurate
[3] C - Sodium N, N-methyl tall oil acid taurate